(12) United States Patent
Aldejani et al.

(10) Patent No.: US 12,241,321 B2
(45) Date of Patent: Mar. 4, 2025

(54) RETRIEVABLE ACOUSTIC MUD LEVEL DETECTOR

(71) Applicant: Saudi Arabian Oil Company, Dhahran (SA)

(72) Inventors: Abdullah Mohammed Aldejani, Dammam (SA); Talal Al Hadi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 116 days.

(21) Appl. No.: 17/898,219

(22) Filed: Aug. 29, 2022

(65) Prior Publication Data
US 2024/0068310 A1 Feb. 29, 2024

(51) Int. Cl.
*E21B 21/08* (2006.01)
*E21B 47/047* (2012.01)
*G01F 23/2962* (2022.01)
*G01V 1/18* (2006.01)
*G01V 1/48* (2006.01)

(52) U.S. Cl.
CPC ............ *E21B 21/08* (2013.01); *E21B 47/047* (2020.05); *G01F 23/2962* (2013.01); *G01V 1/181* (2013.01); *G01V 1/48* (2013.01); *G01V 2200/16* (2013.01); *G01V 2210/32* (2013.01)

(58) Field of Classification Search
CPC ....... E21B 47/047; E21B 21/08; G01V 1/181; G01V 1/48; G01V 2200/16; G01V 2210/32; G01F 23/2962
See application file for complete search history.

(56) References Cited

U.S. PATENT DOCUMENTS

| | | | |
|---|---|---|---|
| 4,728,941 A | 3/1988 | Andrejasich | |
| 2012/0067590 A1* | 3/2012 | Fossli | E21B 21/01 175/7 |
| 2014/0124210 A1* | 5/2014 | Dowell | E21B 47/047 166/336 |
| 2015/0300161 A1* | 10/2015 | Kamata | G01V 1/46 166/250.01 |
| 2016/0312565 A1* | 10/2016 | Papadimitriou | E21B 33/064 |
| 2020/0386097 A1* | 12/2020 | Fournier | G01V 3/30 |

FOREIGN PATENT DOCUMENTS

| | | | |
|---|---|---|---|
| EP | 0372700 | 6/1990 | |
| KR | 101169103 | 7/2012 | |
| WO | WO-2017031578 A1 * | 3/2017 | E21B 47/04 |

* cited by examiner

*Primary Examiner* — Caroline N Butcher
(74) *Attorney, Agent, or Firm* — Fish & Richardson P.C.

(57) ABSTRACT

Systems and methods include increasing a kill mud weight based on information from a downhole tool. A tool is deployed on a bottom hole assembly (BHA) near a surface of a well being drilled. The tool is a retrievable acoustic mud level detector configured to send and receive acoustic waves during drilling. Acoustic waves are propagated using an acoustic wave source. The acoustic waves propagate constantly through an air medium in a wellbore of the well and partially reflect waves when meeting a fluid interface in the wellbore. A signal including a reflected wave reflected from the fluid interface is received using an acoustic wave receiver. An estimate of a fluid level depth of the fluid interface is determined using the tool. A kill mud weight of mud in the wellbore is increased in response to determining the estimate and using a current mud weight of mud in the wellbore.

20 Claims, 4 Drawing Sheets

RETRIEVABLE ACOUSTIC MUD LEVEL DETECTOR

TECHNICAL FIELD

The present disclosure applies to drilling operations.

BACKGROUND

In conventional drilling operations, such as drilling operations for oil wells, the borehole of the well is normally filled with kill fluid in order to provide enough hydrostatic pressure to control the penetrated formation pressures. This is done to prevent potential well control incidents. The amount of hydrostatic pressure that is generated depends on the used mud density and the height of the fluid column (FIG. 1). However, when a loss zone (e.g., a fracture with a relatively lower pressure) is penetrated while drilling, the used mud fluid normally migrates at different rates to the loss zone (FIG. 2). When the rate of losses is greater than the filling rate, then it is not possible to maintain the fluid level at surface. This can result in creating uncertainty about the actual hydrostatic overbalance. Overbalances that are low enough can lead to formation fluid uncontrollably migrating to the surface, risking the lives of people working on the rig. In current practices in which such scenarios are encountered, the mud weight is typically proactively increased by 5 to 10 pounds per cubic feet (pcf) to account for the drop in fluid level. However, this solution can sometimes be quite expensive due to the high cost of chemicals required to increase the mud weight, which is eventually lost in the loss zone. The increase by 5-10 pcf to compensate for lost hydrostatic pressure resulting from fluid column drop is purely based on experience and is not based on quantitative measurements and may not be applicable for every well.

SUMMARY

The present disclosure describes techniques that can be used for controlling, based on quantitative information, increases to the mud weight during drilling operations. In some implementations, a computer-implemented method includes the following. A tool is deployed on a bottom hole assembly (BHA) near a surface of a well being drilled. The tool is a retrievable acoustic mud level detector configured to send and receive acoustic waves during a drilling operation of the well. Acoustic waves are propagated using an acoustic wave source in the tool. The acoustic waves propagate constantly through an air medium in a wellbore of the well and partially reflect waves when meeting a fluid interface in the wellbore. A signal including a reflected wave reflected from the fluid interface is received using an acoustic wave receiver on the tool. An estimate of a fluid level depth of the fluid interface is determined using the tool to process the received signal. A kill mud weight of mud in the wellbore is increased in response to determining the estimate and using a current mud weight of mud in the wellbore.

The previously described implementation is implementable using a computer-implemented method; a non-transitory, computer-readable medium storing computer-readable instructions to perform the computer-implemented method; and a computer-implemented system including a computer memory interoperably coupled with a hardware processor configured to perform the computer-implemented method, the instructions stored on the non-transitory, computer-readable medium.

The subject matter described in this specification can be implemented in particular implementations, so as to realize one or more of the following advantages. Techniques of the present disclosure can provide a quantitative estimate of the mud level, making it possible to quantitatively and accurately adjust the required mud weight for a drilling operation. Developing this technology and methodology can minimize the frequency of well control incidents due to total losses cases. Conventional techniques typically focus on fixed detectors, in which a source and receivers are separated. A tool created using the present techniques can provide mobility, in that the availability of top and bottom connections of the tool allows for the installation and retrieval between drill pipes by the rig when needed, a feature not available using conventional techniques. The design of the present disclosure combines the source and receiver in a single, integrated tool having a vertical configuration, allowing the tool to pass through the blowout preventer (BOP) and be lowered to the casing. Knowing the location of fluid level during drilling is economically advantageous, allowing a more accurate kill mud weight adjustment. By comparison, in conventional systems, it is normal that in case of total losses where the fluid level is unknown, it is industry common practice that the kill mud weight is increased by 10 pounds per cubic feet (pcf) to account for the uncertain hydrostatic pressure drop resulting from the fluid level drop. Techniques of the present disclosure enable a more precise estimate of the current fluid level and, accordingly, an improved adjustment to the kill mud weight as needed (e.g., less than 10 pcf). Cost savings that are derived from saving the chemicals required to increase the mud weight are quantitatively proportional to the mud weight. However, the cost savings can also vary depending on the types of chemicals required to adjust the mud weight as well as the rate of losses.

The details of one or more implementations of the subject matter of this specification are set forth in the Detailed Description, the accompanying drawings, and the claims. Other features, aspects, and advantages of the subject matter will become apparent from the Detailed Description, the claims, and the accompanying drawings.

DESCRIPTION OF DRAWINGS

Like reference numbers and designations in the various drawings indicate like elements.

DETAILED DESCRIPTION

The following detailed description describes techniques for more accurate (e.g., necessary and sufficient) kill mud weight adjustments during drilling operations. Various modifications, alterations, and permutations of the disclosed implementations can be made and will be readily apparent to those of ordinary skill in the art, and the general principles defined may be applied to other implementations and applications, without departing from the scope of the disclosure. In some instances, details unnecessary to obtain an understanding of the described subject matter may be omitted so as to not obscure one or more described implementations with unnecessary detail and inasmuch as such details are within the skill of one of ordinary skill in the art. The present disclosure is not intended to be limited to the described or illustrated implementations, but to be accorded the widest scope consistent with the described principles and features.

The present disclosure describes a new tool that can be positioned with the drilling bottom hole assembly (BHA) near the surface to estimate the fluid level in the wellbore in case of total losses. The tool includes an acoustic wave source and receiver attached to a metallic pipe with a top and bottom connection, such that the acoustic wave propagates constantly through the air medium and partially reflects when it meets the fluid interface. The acoustic receiver picks up the reflected wave, and then the signal is processed to estimate the fluid level depth.

Figure 1:
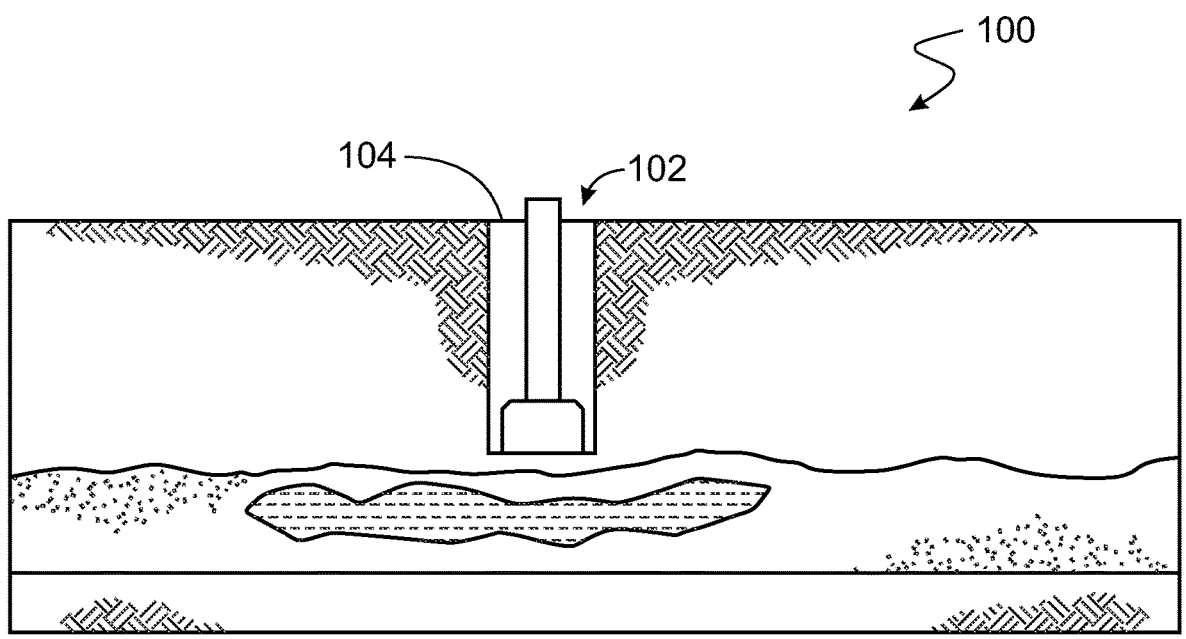
FIG. 1 shows an example of a full column of fluid during drilling in a conventional system, according to some implementations of the present disclosure.
Figure 2:
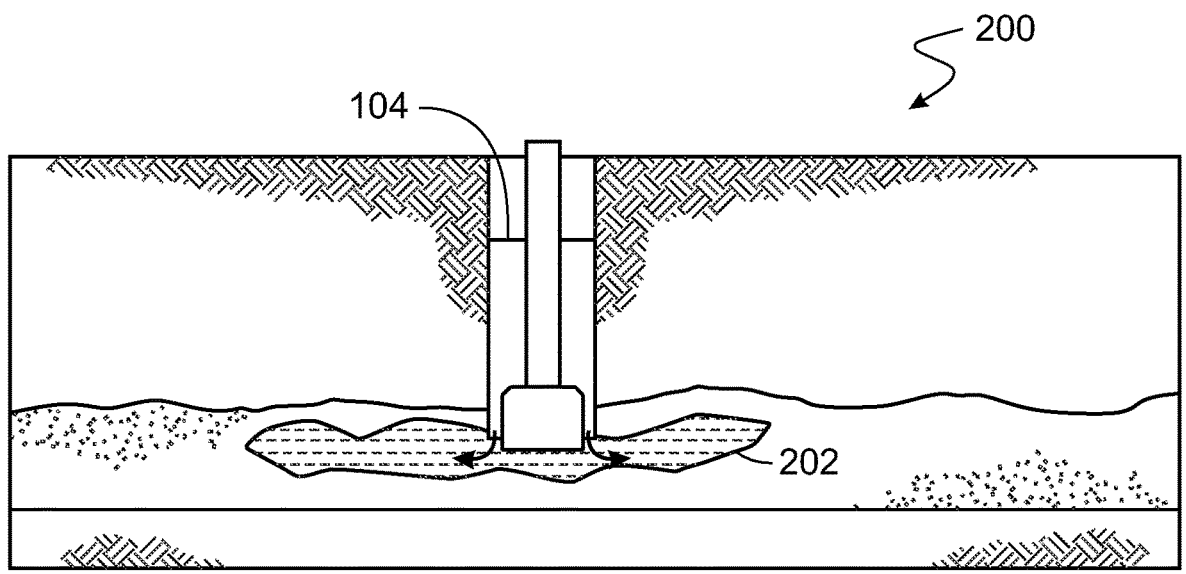
FIG. 2 shows an example of fluid level drops in a complete loss formation, according to some implementations of the present disclosure.

In conventional drilling operations, such as for oil wells, the borehole of the well is normally filled with kill fluid in order to provide enough hydrostatic pressure to control the penetrated formation pressures (e.g., to balance the formation pressure). This is done to prevent potential well control incidents. FIG. 1 shows an example of a full column of fluid 102 during drilling in a conventional system 100, according to some implementations of the present disclosure. The amount of hydrostatic pressure that is generated depends on the used mud density and the height of the fluid column and a fluid level 104, as shown in FIG. 1. FIG. 2 shows an example of fluid level drops in a complete loss formation a conventional system 200, according to some implementations of the present disclosure. When a loss zone 202 (e.g., a fracture with a relatively lower pressure) is penetrated while drilling, the used mud fluid normally migrates at different rates to the loss zone 202. When the rate of losses is greater than the filling rate, then it is not possible to maintain the fluid level at surface. This can result in creating uncertainty of the actual hydrostatic overbalance. Overbalances that are low enough can lead to formation fluid uncontrollably migrating to surface, risking the lives of people working on the rig. In current practices in which such scenarios may be encountered, the mud weight is typically proactively increased by 5 to 10 pcf to account for the drop in fluid level. However, this solution can sometimes be quite expensive due to the high cost of chemicals required to increase the mud weight, which is eventually lost in the loss zone.

The present disclosure describes techniques that can be used to resolve the issues identified with respect to FIGS. 1 and 2. The techniques include estimating the fluid level, which can be used to estimate the actual mud weight required to overbalance the well.

Figure 3:
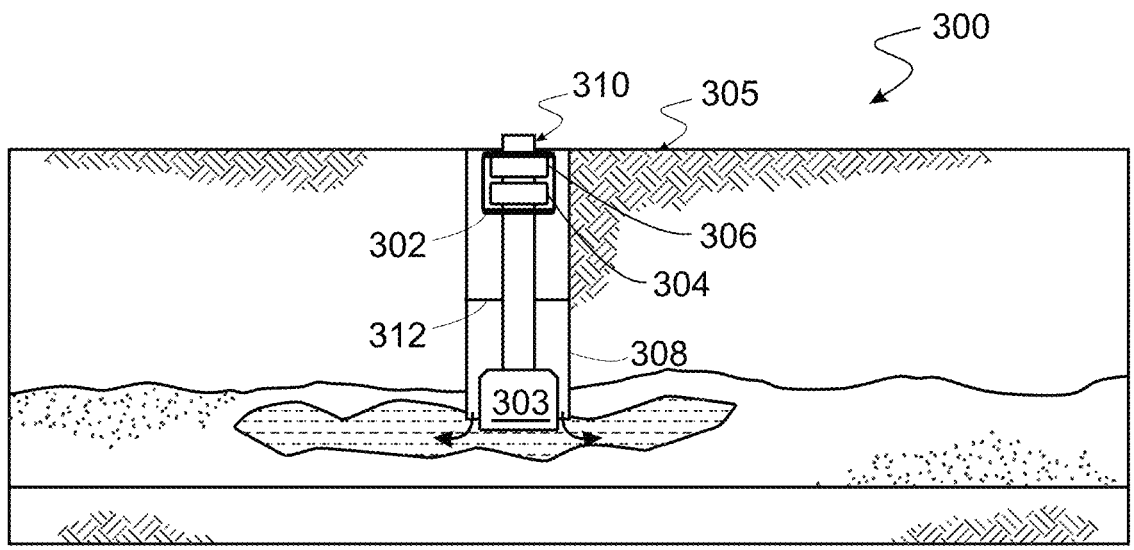
FIG. 3 is a diagram showing an example of a tool made for use near the drilling bottom hole assembly (BHA) near the surface to estimate the fluid level in a wellbore in the case of total losses, according to some implementations of the present disclosure.

FIG. 3 is a diagram showing an example of a tool 302 made for use near the drilling bottom hole assembly (BHA) 303 near the ground surface 305 to estimate the fluid level in a wellbore 308 in the case of total losses in a drilling system 300, according to some implementations of the present disclosure. The tool 302 is attached to a metallic pipe 310 with a top and bottom connection. The tool 302 includes an acoustic wave source 304 and an acoustic wave receiver 306. The acoustic wave receiver 306 detects an acoustic wave reflected by a fluid interface 312.

Figure 4:
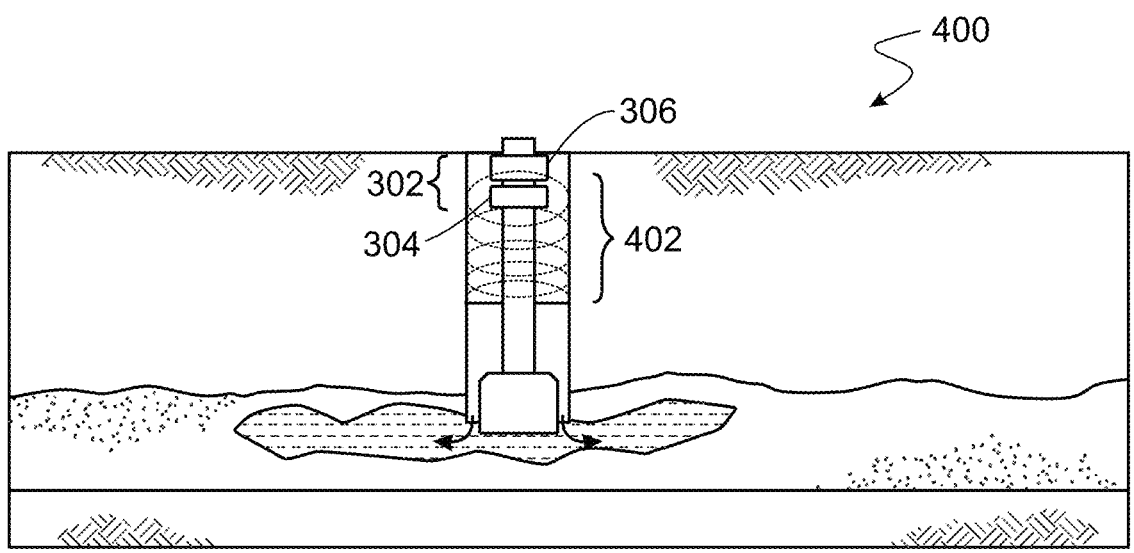
FIG. 4 is a schematic of the tool, according to some implementations of the present disclosure.

FIG. 4 is a diagram showing example acoustic waves 402 generated by the tool 302, according to some implementations of the present disclosure. The tool includes the acoustic wave source 304 and the acoustic wave receiver 306 assembled to the drilling BHA near the surface (FIG. 3). The source generates acoustic waves 402 which propagates at certain velocities through an air medium. Part of the acoustic wave is reflected when it hits the water interface (fluid level), as a first change in the medium, and eventually picked by the receiver. Then, using techniques common to (or in addition to) techniques used in seismology work, the obtained time data is processed and converted to depth. For example, speed=distance/time>>the speed of sound in air (e.g., 323 meters per second (m/s). This is the time for the acoustic wave to travel through the air and be reflected by the fluid interface and recorded by the tool 302. The product of the speed of sound multiplied by the recorded acoustic reflection time, when divided by two, can provide an estimate of the distance that the acoustic wave has traveled to hit the water interface, which is equivalent to the mud fluid level (FIG. 4). This example equation is just used to illustrate the principle used in the present disclosure. Other more sophisticated equations and processing may be required, e.g., to cancel acoustic noise and to provide a more accurate estimate.

Figure 5:
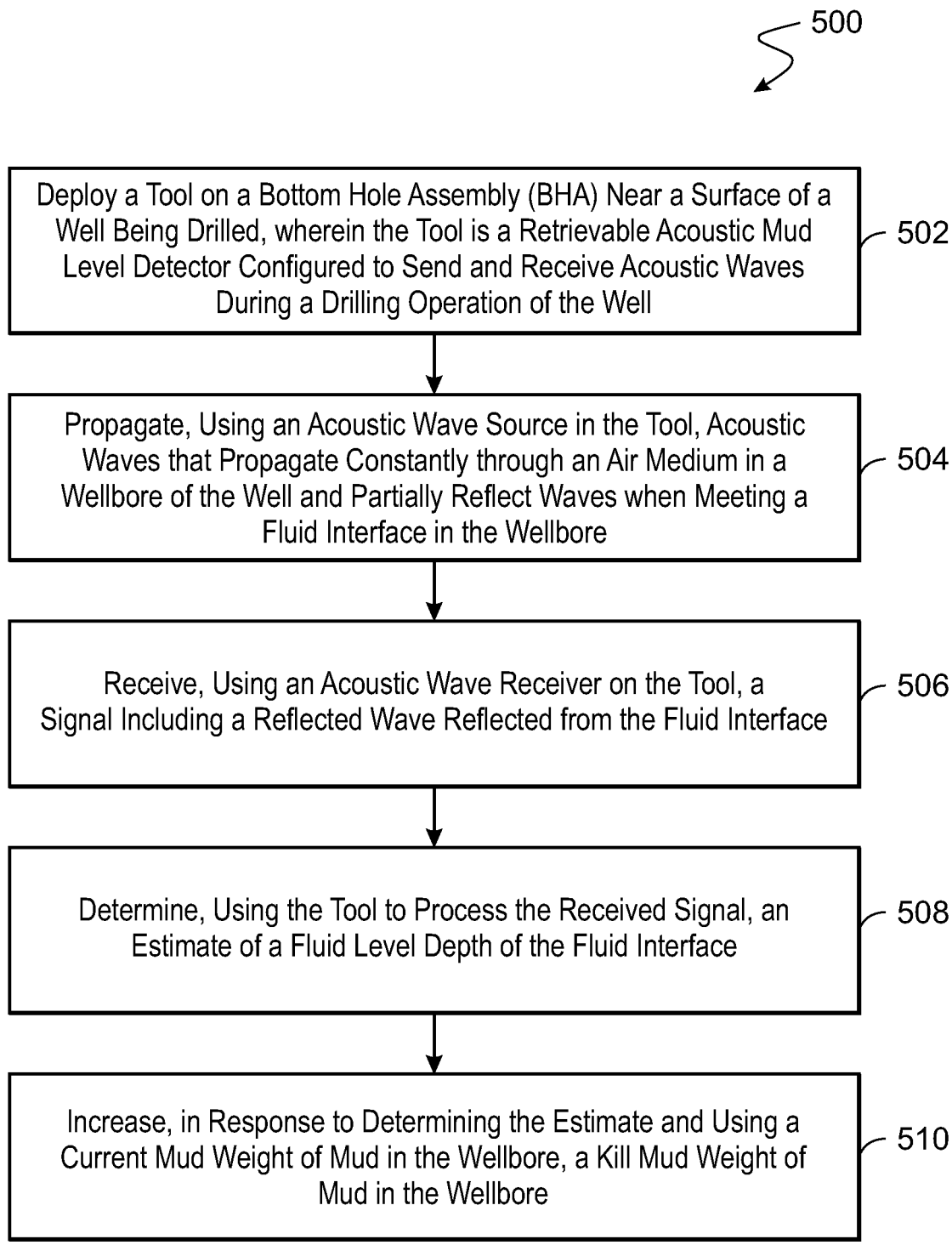
FIG. 5 is a flowchart of an example of a method for increasing the mud weight of mud in a wellbore in response to determining an estimate using a current mud weight of mud in the wellbore, according to some implementations of the present disclosure.

FIG. 5 is a flowchart of an example of a method 500 for increasing the mud weight of mud in a wellbore in response to determining an estimate using a current mud weight of mud in the wellbore, according to some implementations of the present disclosure. For clarity of presentation, the description that follows generally describes method 500 in the context of the other figures in this description. However, it will be understood that method 500 can be performed, for example, by any suitable system, environment, software, and hardware, or a combination of systems, environments, software, and hardware, as appropriate. In some implementations, various steps of method 500 can be run in parallel, in combination, in loops, or in any order.

At 502, a tool is deployed on a bottom hole assembly (BHA) near a surface of a well being drilled. The tool is a retrievable acoustic mud level detector configured to send and receive acoustic waves during a drilling operation of the well. Deploying the tool can include passing the tool through a blowout preventer (BOP) and lowering the tool to a casing, for example. From 502, method 500 proceeds to 504.

At 504, acoustic waves are propagated using an acoustic wave source in the tool. The acoustic waves propagate constantly through an air medium in a wellbore of the well and partially reflect waves when meeting a fluid interface in the wellbore. The acoustic wave source and the acoustic wave receiver are integrated on the same tool, as shown in FIG. 3. In some implementations, the acoustic wave receiver can be attached to a metallic pipe with a top and bottom connection on the tool. The acoustic wave source can be, for example, an industry standard acoustic source such as air guns, a plasma sound source, or an electromagnetic pulse energy source. The acoustic wave receiver can be an industry standard acoustic receiver, such as a geophone. From 504, method 500 proceeds to 506.

At 506, a signal including a reflected wave reflected from the fluid interface is received using an acoustic wave receiver on the tool, e.g., as described with reference to FIG. 4. In some implementations, acoustic noise received by the acoustic wave receiver can be canceled to provide a more accurate estimate of the fluid level depth. From 506, method 500 proceeds to 508.

At 508, an estimate of a fluid level depth of the fluid interface is determined using the tool to process the received signal. For example, the estimate can be based on functions including speed=distance/time, as described with reference to FIG. 4. From 508, method 500 proceeds to 510.

At 510, a kill mud weight of mud in the wellbore is increased in response to determining the estimate using a current mud weight of mud in the wellbore. For example, increasing the kill mud weight of the mud in the wellbore can include automatically injecting mud into the wellbore based on the estimate, e.g., using computer-implemented software at the surface of the well. After 510, method 500 can stop.

In some implementations, in addition to (or in combination with) any previously-described features, techniques of the present disclosure can include the following. Outputs of the techniques of the present disclosure can be performed before, during, or in combination with wellbore operations, such as to provide inputs to change the settings or parameters of equipment used for drilling. Examples of wellbore operations include forming/drilling a wellbore, hydraulic fracturing, and producing through the wellbore, to name a few. The wellbore operations can be triggered or controlled, for example, by outputs of the methods of the present disclosure. In some implementations, customized user interfaces can present intermediate or final results of the above described processes to a user. Information can be presented in one or more textual, tabular, or graphical formats, such as through a dashboard. The information can be presented at one or more on-site locations (such as at an oil well or other facility), on the Internet (such as on a webpage), on a mobile application (or "app"), or at a central processing facility. The presented information can include suggestions, such as suggested changes in parameters or processing inputs, that the user can select to implement improvements in a production environment, such as in the exploration, production, and/or testing of petrochemical processes or facilities. For example, the suggestions can include parameters that, when selected by the user, can cause a change to, or an improvement in, drilling parameters (including drill bit speed and direction) or overall production of a gas or oil well. The suggestions, when implemented by the user, can improve the speed and accuracy of calculations, streamline processes, improve models, and solve problems related to efficiency, performance, safety, reliability, costs, downtime, and the need for human interaction. In some implementations, the suggestions can be implemented in real-time, such as to provide an immediate or near-immediate change in operations or in a model. The term real-time can correspond, for example, to events that occur within a specified period of time, such as within one minute or within one second. Events can include readings or measurements captured by downhole equipment such as sensors, pumps, bottom hole assemblies, or other equipment. The readings or measurements can be analyzed at the surface, such as by using applications that can include modeling applications and machine learning. The analysis can be used to generate changes to settings of downhole equipment, such as drilling equipment. In some implementations, values of parameters or other variables that are determined can be used automatically (such as through using rules) to implement changes in oil or gas well exploration, production/drilling, or testing. For example, outputs of the present disclosure can be used as inputs to other equipment and/or systems at a facility. This can be especially useful for systems or various pieces of equipment that are located several meters or several miles apart, or are located in different countries or other jurisdictions.

Figure 6:
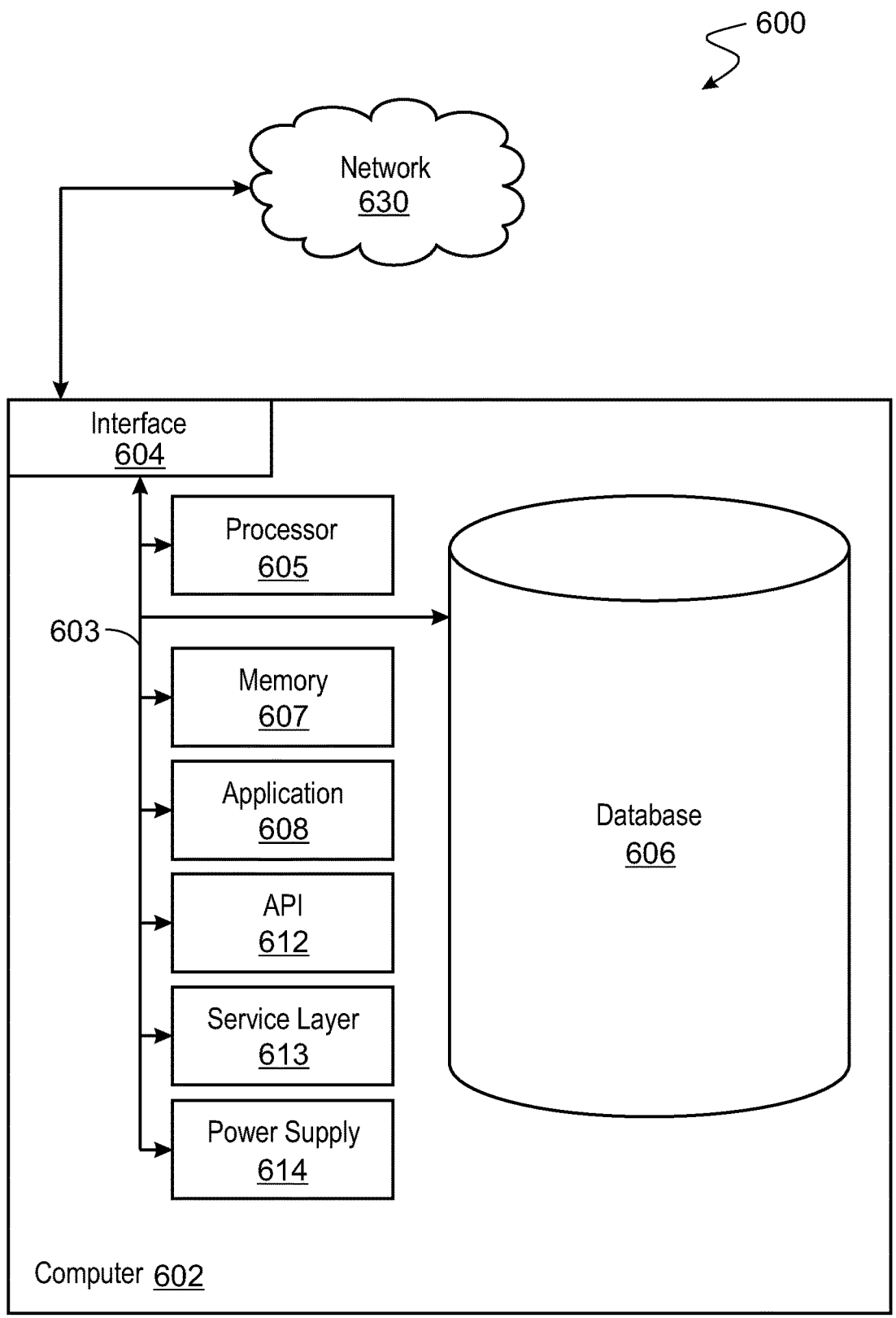
FIG. 6 is a block diagram illustrating an example computer system used to provide computational functionalities associated with described algorithms, methods, functions, processes, flows, and procedures as described in the present disclosure, according to some implementations of the present disclosure.

FIG. 6 is a block diagram of an example computer system 600 used to provide computational functionalities associated with described algorithms, methods, functions, processes, flows, and procedures described in the present disclosure, according to some implementations of the present disclosure. The illustrated computer 602 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 602 can include input devices such as keypads, keyboards, and touch screens that can accept user information. Also, the computer 602 can include output devices that can convey information associated with the operation of the computer 602. The information can include digital data, visual data, audio information, or a combination of information. The information can be presented in a graphical user interface (UI) (or GUI).

The computer 602 can serve in a role as a client, a network component, a server, a database, a persistency, or components of a computer system for performing the subject matter described in the present disclosure. The illustrated computer 602 is communicably coupled with a network 630. In some implementations, one or more components of the computer 602 can be configured to operate within different environments, including cloud-computing-based environments, local environments, global environments, and combinations of environments.

At a top level, the computer 602 is an electronic computing device operable to receive, transmit, process, store, and manage data and information associated with the described subject matter. According to some implementations, the computer 602 can also include, or be communicably coupled with, an application server, an email server, a web server, a caching server, a streaming data server, or a combination of servers.

The computer 602 can receive requests over network 630 from a client application (for example, executing on another computer 602). The computer 602 can respond to the received requests by processing the received requests using software applications. Requests can also be sent to the computer 602 from internal users (for example, from a command console), external (or third) parties, automated applications, entities, individuals, systems, and computers.

Each of the components of the computer 602 can communicate using a system bus 603. In some implementations, any or all of the components of the computer 602, including hardware or software components, can interface with each other or the interface 604 (or a combination of both) over the system bus 603. Interfaces can use an application programming interface (API) 612, a service layer 613, or a combination of the API 612 and service layer 613. The API 612 can include specifications for routines, data structures, and object classes. The API 612 can be either computer-language independent or dependent. The API 612 can refer to a complete interface, a single function, or a set of APIs.

The service layer 613 can provide software services to the computer 602 and other components (whether illustrated or not) that are communicably coupled to the computer 602. The functionality of the computer 602 can be accessible for all service consumers using this service layer. Software services, such as those provided by the service layer 613, can provide reusable, defined functionalities through a defined interface. For example, the interface can be software written in JAVA, C++, or a language providing data in extensible markup language (XML) format. While illustrated as an integrated component of the computer 602, in alternative implementations, the API 612 or the service layer 613 can be stand-alone components in relation to other components of the computer 602 and other components communicably coupled to the computer 602. Moreover, any or all parts of the API 612 or the service layer 613 can be implemented as child or sub-modules of another software module, enterprise application, or hardware module without departing from the scope of the present disclosure.

The computer 602 includes an interface 604. Although illustrated as a single interface 604 in FIG. 6, two or more interfaces 604 can be used according to particular needs, desires, or particular implementations of the computer 602 and the described functionality. The interface 604 can be used by the computer 602 for communicating with other systems that are connected to the network 630 (whether illustrated or not) in a distributed environment. Generally, the interface 604 can include, or be implemented using, logic encoded in software or hardware (or a combination of software and hardware) operable to communicate with the network 630. More specifically, the interface 604 can include software supporting one or more communication protocols associated with communications. As such, the network 630 or the interface's hardware can be operable to communicate physical signals within and outside of the illustrated computer 602.

The computer 602 includes a processor 605. Although illustrated as a single processor 605 in FIG. 6, two or more processors 605 can be used according to particular needs, desires, or particular implementations of the computer 602 and the described functionality. Generally, the processor 605 can execute instructions and can manipulate data to perform the operations of the computer 602, including operations using algorithms, methods, functions, processes, flows, and procedures as described in the present disclosure.

The computer 602 also includes a database 606 that can hold data for the computer 602 and other components connected to the network 630 (whether illustrated or not). For example, database 606 can be an in-memory, conventional, or a database storing data consistent with the present disclosure. In some implementations, database 606 can be a combination of two or more different database types (for example, hybrid in-memory and conventional databases) according to particular needs, desires, or particular implementations of the computer 602 and the described functionality. Although illustrated as a single database 606 in FIG. 6, two or more databases (of the same, different, or combination of types) can be used according to particular needs, desires, or particular implementations of the computer 602 and the described functionality. While database 606 is illustrated as an internal component of the computer 602, in alternative implementations, database 606 can be external to the computer 602.

The computer 602 also includes a memory 607 that can hold data for the computer 602 or a combination of components connected to the network 630 (whether illustrated or not). Memory 607 can store any data consistent with the present disclosure. In some implementations, memory 607 can be a combination of two or more different types of memory (for example, a combination of semiconductor and magnetic storage) according to particular needs, desires, or particular implementations of the computer 602 and the described functionality. Although illustrated as a single memory 607 in FIG. 6, two or more memories 607 (of the same, different, or combination of types) can be used according to particular needs, desires, or particular implementations of the computer 602 and the described functionality. While memory 607 is illustrated as an internal component of the computer 602, in alternative implementations, memory 607 can be external to the computer 602.

The application 608 can be an algorithmic software engine providing functionality according to particular needs, desires, or particular implementations of the computer 602 and the described functionality. For example, application 608 can serve as one or more components, modules, or applications. Further, although illustrated as a single application 608, the application 608 can be implemented as multiple applications 608 on the computer 602. In addition, although illustrated as internal to the computer 602, in alternative implementations, the application 608 can be external to the computer 602.

The computer 602 can also include a power supply 614. The power supply 614 can include a rechargeable or non-rechargeable battery that can be configured to be either user- or non-user-replaceable. In some implementations, the power supply 614 can include power-conversion and management circuits, including recharging, standby, and power management functionalities. In some implementations, the power supply 614 can include a power plug to allow the computer 602 to be plugged into a wall socket or a power source to, for example, power the computer 602 or recharge a rechargeable battery.

There can be any number of computers 602 associated with, or external to, a computer system containing computer 602, with each computer 602 communicating over network 630. Further, the terms "client," "user," and other appropriate terminology can be used interchangeably, as appropriate, without departing from the scope of the present disclosure. Moreover, the present disclosure contemplates that many users can use one computer 602 and one user can use multiple computers 602.

Described implementations of the subject matter can include one or more features, alone or in combination.

For example, in a first implementation, a computer-implemented method includes the following. A tool is deployed on a bottom hole assembly (BHA) near a surface of a well being drilled. The tool is a retrievable acoustic mud level detector configured to send and receive acoustic waves during a drilling operation of the well. Acoustic waves are propagated using an acoustic wave source in the tool. The acoustic waves propagate constantly through an air medium in a wellbore of the well and partially reflect waves when meeting a fluid interface in the wellbore. A signal including a reflected wave reflected from the fluid interface is received using an acoustic wave receiver on the tool. An estimate of a fluid level depth of the fluid interface is determined using the tool to process the received signal. A kill mud weight of mud in the wellbore is increased in response to determining the estimate and using a current mud weight of mud in the wellbore.

The foregoing and other described implementations can each, optionally, include one or more of the following features:

A first feature, combinable with any of the following features, where the acoustic wave source and the acoustic wave receiver are integrated on a same tool.

A second feature, combinable with any of the previous or following features, where the acoustic wave receiver is attached to a metallic pipe with a top and bottom connection on the tool.

A third feature, combinable with any of the previous or following features, where increasing the kill mud weight of the mud in the wellbore includes automatically injecting mud into the wellbore based on the estimate.

A fourth feature, combinable with any of the previous or following features, where deploying the tool includes passing the tool through a blowout preventer (BOP) and lowering the tool to a casing.

A fifth feature, combinable with any of the previous or following features, where the method further includes canceling acoustic noise received by the acoustic wave receiver to provide a more accurate estimate of the fluid level depth.

A sixth feature, combinable with any of the previous or following features, where wherein the acoustic wave source is produced by air guns, a plasma sound source, or an electromagnetic pulse energy source, and wherein the acoustic wave receiver is a geophone.

In a second implementation, a non-transitory, computer-readable medium stores one or more instructions executable by a computer system to perform operations including the following. A tool is deployed on a bottom hole assembly (BHA) near a surface of a well being drilled. The tool is a retrievable acoustic mud level detector configured to send and receive acoustic waves during a drilling operation of the well. Acoustic waves are propagated using an acoustic wave source in the tool. The acoustic waves propagate constantly through an air medium in a wellbore of the well and partially reflect waves when meeting a fluid interface in the wellbore. A signal including a reflected wave reflected from the fluid interface is received using an acoustic wave receiver on the tool. An estimate of a fluid level depth of the fluid interface is determined using the tool to process the received signal. A kill mud weight of mud in the wellbore is increased in response to determining the estimate and using a current mud weight of mud in the wellbore.

The foregoing and other described implementations can each, optionally, include one or more of the following features:

A first feature, combinable with any of the following features, where the acoustic wave source and the acoustic wave receiver are integrated on a same tool.

A second feature, combinable with any of the previous or following features, where the acoustic wave receiver is attached to a metallic pipe with a top and bottom connection on the tool.

A third feature, combinable with any of the previous or following features, where increasing the kill mud weight of the mud in the wellbore includes automatically injecting mud into the wellbore based on the estimate.

A fourth feature, combinable with any of the previous or following features, where deploying the tool includes passing the tool through a blowout preventer (BOP) and lowering the tool to a casing.

A fifth feature, combinable with any of the previous or following features, where the operations further include canceling acoustic noise received by the acoustic wave receiver to provide a more accurate estimate of the fluid level depth.

A sixth feature, combinable with any of the previous or following features, where wherein the acoustic wave source is produced by air guns, a plasma sound source, or an electromagnetic pulse energy source, and wherein the acoustic wave receiver is a geophone.

In a third implementation, a computer-implemented system includes one or more processors and a non-transitory computer-readable storage medium coupled to the one or more processors and storing programming instructions for execution by the one or more processors. The programming instructions instruct the one or more processors to perform operations including the following. A tool is deployed on a bottom hole assembly (BHA) near a surface of a well being drilled. The tool is a retrievable acoustic mud level detector configured to send and receive acoustic waves during a drilling operation of the well. Acoustic waves are propagated using an acoustic wave source in the tool. The acoustic waves propagate constantly through an air medium in a wellbore of the well and partially reflect waves when meeting a fluid interface in the wellbore. A signal including a reflected wave reflected from the fluid interface is received using an acoustic wave receiver on the tool. An estimate of a fluid level depth of the fluid interface is determined using the tool to process the received signal. A kill mud weight of mud in the wellbore is increased in response to determining the estimate and using a current mud weight of mud in the wellbore.

The foregoing and other described implementations can each, optionally, include one or more of the following features:

A first feature, combinable with any of the following features, where the acoustic wave source and the acoustic wave receiver are integrated on a same tool.

A second feature, combinable with any of the previous or following features, where the acoustic wave receiver is attached to a metallic pipe with a top and bottom connection on the tool.

A third feature, combinable with any of the previous or following features, where increasing the kill mud weight of the mud in the wellbore includes automatically injecting mud into the wellbore based on the estimate.

A fourth feature, combinable with any of the previous or following features, where deploying the tool includes passing the tool through a blowout preventer (BOP) and lowering the tool to a casing.

A fifth feature, combinable with any of the previous or following features, where the operations further include canceling acoustic noise received by the acoustic wave receiver to provide a more accurate estimate of the fluid level depth.

A sixth feature, combinable with any of the previous or following features, where wherein the acoustic wave source is produced by air guns, a plasma sound source, or an electromagnetic pulse energy source, and wherein the acoustic wave receiver is a geophone.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. For example, the signal can be a machine-generated electrical, optical, or electromagnetic signal that is generated to encode information for transmission to a suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatuses, devices, and machines for processing data, including by way of example, a programmable processor, a computer, or multiple processors or computers. The apparatus can also include special purpose logic circuitry including, for example, a central processing unit (CPU), a field-programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, such as LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory.

Graphics processing units (GPUs) can also be used in combination with CPUs. The GPUs can provide specialized processing that occurs in parallel to processing performed by CPUs. The specialized processing can include artificial intelligence (AI) applications and processing, for example. GPUs can be used in GPU clusters or in multi-GPU computing.

A computer can include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated into, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that the user uses. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch-screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at the application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations. It should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

What is claimed is:

1. A computer-implemented method, comprising:
deploying a tool on a bottom hole assembly (BHA) near a ground surface of a well being drilled, wherein the tool is a retrievable acoustic mud level detector comprising an acoustic wave source vertically integrated with an acoustic wave receiver forming a mobile configuration, the acoustic wave source comprises a plasma sound source configured to send acoustic waves during a drilling operation of the well and the acoustic wave receiver comprising a geophone configured to receive reflected acoustic waves during the drilling operation of the well;

generating, using the acoustic wave source in the tool, acoustic waves that propagate constantly through an air medium in a wellbore of the well and partially reflect waves when meeting a fluid interface in the wellbore;

receiving, using the acoustic wave receiver on the tool, a signal comprising a reflected wave reflected from the fluid interface;

determining, using the tool to process the signal, an estimate of a fluid level depth of the fluid interface; and increasing, using a current mud weight of mud in the wellbore, a kill mud weight of mud in the wellbore.

2. The computer-implemented method of claim 1, wherein the estimate of the fluid level depth of the fluid interface is indicative of a rate of losses relative to a filling rate and increasing the kill mud weight of mud in the wellbore maintains a constant fluid level depth.

3. The computer-implemented method of claim 1, wherein the tool is attached to a metallic pipe using a top connection and bottom connection.

4. The computer-implemented method of claim 1, wherein increasing the kill mud weight of mud in the wellbore comprises automatically injecting mud into the wellbore based on the estimate.

5. The computer-implemented method of claim 1, wherein deploying the tool comprises passing the tool through a blowout preventer (BOP) and lowering the tool to a casing.

6. The computer-implemented method of claim 1, further comprising:

canceling acoustic noise received by the acoustic wave receiver to increase an accuracy of the estimate of the fluid level depth.

7. The computer-implemented method of claim 1, wherein the estimate of the fluid level depth determined from a timing of the reflected wave.

8. A non-transitory, computer-readable medium storing one or more instructions executable by a computer system to perform operations comprising:

deploying a tool on a bottom hole assembly (BHA) near a ground surface of a well being drilled, wherein the tool is a retrievable acoustic mud level detector comprising an acoustic wave source vertically integrated with an acoustic wave receiver forming a mobile configuration, the acoustic wave source comprises a plasma sound source configured to send acoustic waves during a drilling operation of the well and the acoustic wave receiver comprising a geophone configured to receive reflected acoustic waves during the drilling operation of the well;

generating, using the acoustic wave source in the tool, acoustic waves that propagate constantly through an air medium in a wellbore of the well and partially reflect waves when meeting a fluid interface in the wellbore;

receiving, using the acoustic wave receiver on the tool, a signal comprising a reflected wave reflected from the fluid interface;

determining, using the tool to process the signal, an estimate of a fluid level depth of the fluid interface; and increasing, using a current mud weight of mud in the wellbore, a kill mud weight of mud in the wellbore.

9. The non-transitory, computer-readable medium of claim 8, wherein the estimate of the fluid level depth of the fluid interface is indicative of a rate of losses relative to a filling rate and increasing the kill mud weight of mud in the wellbore maintains a constant fluid level depth.

10. The non-transitory, computer-readable medium of claim 8, wherein the tool is attached to a metallic pipe using a top connection and bottom connection.

11. The non-transitory, computer-readable medium of claim 8, wherein increasing the kill mud weight of mud in the wellbore comprises automatically injecting mud into the wellbore based on the estimate.

12. The non-transitory, computer-readable medium of claim 8, wherein deploying the tool comprises passing the tool through a blowout preventer (BOP) and lowering the tool to a casing.

13. The non-transitory, computer-readable medium of claim 8, further comprising:

canceling acoustic noise received by the acoustic wave receiver to increase an accuracy of the estimate of the fluid level depth.

14. The non-transitory, computer-readable medium of claim 8, wherein the estimate of the fluid level depth determined from a timing of the reflected wave.

15. A computer-implemented system, comprising:

one or more processors; and a non-transitory computer-readable storage medium coupled to the one or more processors and storing programming instructions for execution by the one or more processors, the programming instructions instructing the one or more processors to perform operations comprising:

deploying a tool on a bottom hole assembly (BHA) near a ground surface of a well being drilled, wherein the tool is a retrievable acoustic mud level detector comprising an acoustic wave source vertically integrated with an acoustic wave receiver forming a mobile configuration, the acoustic wave source comprises a plasma sound source configured to send acoustic waves during a drilling operation of the well and the acoustic wave receiver comprising a geophone configured to receive reflected acoustic waves during the drilling operation of the well;

generating, using the acoustic wave source in the tool, acoustic waves that propagate constantly through an air medium in a wellbore of the well and partially reflect waves when meeting a fluid interface in the wellbore;

receiving, using the acoustic wave receiver on the tool, a signal comprising a reflected wave reflected from the fluid interface;

determining, using the tool to process the signal, an estimate of a fluid level depth of the fluid interface; and increasing, using a current mud weight of mud in the wellbore, a kill mud weight of mud in the wellbore.

16. The computer-implemented system of claim 15, wherein the estimate of the fluid level depth of the fluid interface is indicative of a rate of losses relative to a filling rate and increasing the kill mud weight of mud in the wellbore maintains a constant fluid level depth.

17. The computer-implemented system of claim 15, wherein the tool is attached to a metallic pipe using a top connection and bottom connection.

18. The computer-implemented system of claim 15, wherein increasing the kill mud weight of mud in the wellbore comprises automatically injecting mud into the wellbore based on the estimate.

19. The computer-implemented system of claim 15, wherein deploying the tool comprises passing the tool through a blowout preventer (BOP) and lowering the tool to a casing.

20. The computer-implemented system of claim 15, further comprising:
    canceling acoustic noise received by the acoustic wave receiver to increase an accuracy of the estimate of the fluid level depth.

\* \* \* \* \*